United States Patent [19]
Nakanishi et al.

[11] 3,884,922
[45] May 20, 1975

[54] 11-(4-PYRIDYLALKYL-PIPERAZINO)-DIBENZOTHIAZEPINES

[75] Inventors: Michio Nakanishi, Oita; Tomohiko Munakata, Fujuoka; Yutaka Maruyama, Tokyo; Shinro Setoguchi, Fukuoka, all of Japan

[73] Assignee: Yoshitomi Pharmaceutical Industry, Ltd., Osaka, Japan

[22] Filed: Mar. 9, 1973

[21] Appl. No.: 339,794

Related U.S. Application Data

[62] Division of Ser. No. 60,139, July 31, 1970, Pat. No. 3,761,481.

[30] Foreign Application Priority Data
July 31, 1969 Japan.............................. 44-60651
Sept. 25, 1969 Japan.............................. 44-76775
Oct. 2, 1969 Japan.............................. 44-79478

[52] U.S. Cl............... 260/268 TR; 260/239 DD; 260/327 B; 260/333; 260/47 D; 260/471 A; 424/250
[51] Int. Cl........................................... C07d 51/70
[58] Field of Search................... 260/268 TR, 268 H

[56] References Cited
UNITED STATES PATENTS

| | | | |
|---|---|---|---|
| 3,188,313 | 6/1965 | Archer............................ | 260/268 H |
| 3,412,193 | 11/1968 | Coppola........................ | 260/268 DT |
| 3,681,354 | 8/1972 | Masturs et al................... | 260/268 T |
| 3,681,357 | 8/1972 | Howell et al..................... | 260/268 T |

Primary Examiner—Donald G. Daus
Assistant Examiner—Jose Tovar
Attorney, Agent, or Firm—Sughrue, Rothwell, Mion, Zinn & Macpeak

[57] ABSTRACT

Piperazine derivatives having the formula

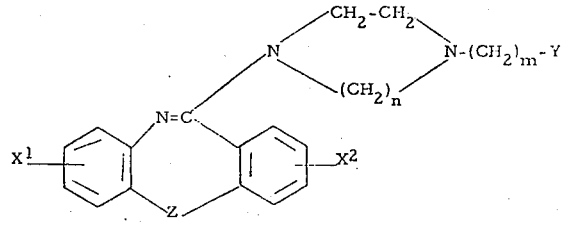

wherein each of $X^1$ and $X^2$ is H, Cl, $CH_3$, $CH_3O$ or $CF_3$; Y is thienyl, furyl, pyridyl, thiazolyl, phenyl or substituted phenyl, in which the phenyl substituents are 1 or 2 groups selected from the group consisting of Cl, $CH_3$, $CH_3O$ and $CF_3$; Z is —S—, —$SO_2$—, —O—, —NR— or —$SO_2$—NR—, in which R is an alkyl group having from 1 to 4 carbon atoms; $n$ is 2 or 3; and $m$ is 0, 1 or 2; and the pharmaceutically acceptable acid addition salts thereof are disclosed. The piperazine derivatives and their pharmaceutically acceptable addition salts are useful as anti-allergics, psychotropics and analgesics.

9 Claims, No Drawings

11-(4-PYRIDYLALKYL-PIPERAZINO)-DIBENZOTHIAZEPINES

CROSS-REFERENCE TO RELATED APPLICATIONS

This application is a divisional application of our earlier copending application Ser. No. 60,139 filed on July 31, 1970 now U.S. Pat. No. 3,761,481, issued Sept. 25, 1973, and claims priority from July 31, 1969, Sept. 25, 1969 and Oct. 2, 1969, respectively, based on Japanese Pat. application Ser. Nos. 60651/69, 76775/69 and 79478/69, respectively.

FIELD OF THE INVENTION

This invention relates to novel and therapeutically valuable piperazine derivatives.

SUMMARY OF THE INVENTION

The novel piperazine derivatives of this invention are compounds having the following general formula [I]

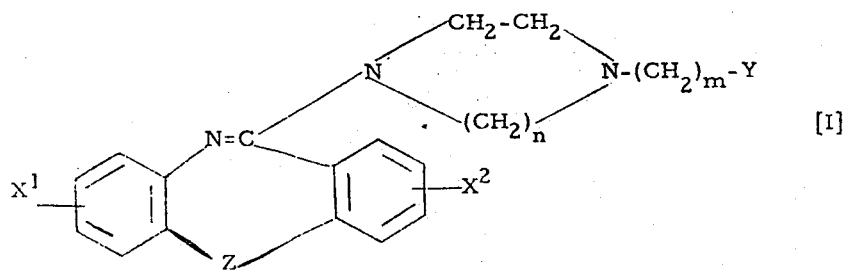

wherein $X^1$ and $X^2$ each is selected from the group consisting of H, Cl, $CH_3$, $CH_3O$ and $CF_3$; wherein Y is selected from the group consisting of a thienyl, a furyl, a pyridyl, a thiazolyl, a phenyl and a mono- or di-substituted phenyl group, in which the substituents are selected from the group consisting of Cl, $CH_3$, $CH_3O$ and $CF_3$; wherein Z is selected from the group consisting of —S—, —$SO_2$—, —O—, —NR— or —$SO_2$—NR—, in which R is an alkyl group having from 1 to 4 carbon atoms, such as methyl, ethyl, propyl and butyl; wherein $n$ is an integer of 2 or 3; and wherein $m$ is an integer 0, 1 or 2, and the pharmaceutically acceptable acid addition salts thereof.

DETAILED DESCRIPTION OF THE INVENTION

The compounds of formula [I] can be produced by reacting a compound having the formula

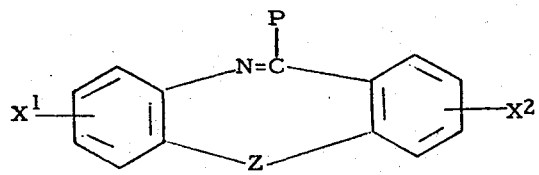

with a compound having the formula

wherein $X^1$, $X^2$, Y, Z and m have the same meanings as described above, and one of P and Q is a group having the formula

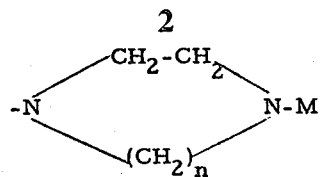

wherein n has the same meaning as described above and M is an H atom or an alkali metal atom, such as Na or K, and the other is a reactive residue such as a halogen atom (for example, Cl, Br or I), an organic sulfonyloxy group (for example, methylsulfonyloxy, phenylsulfonyloxy or p-tolylsulfonyloxy), or a lower alkylthio group or an aralkylthio group (for example, methylthio, benzylthio or p-nitrobenzylthio).

The reaction is usually carried out in an inert solvent, such as benzene, toluene, xylene, dimethyl ether, diethyl ether, dioxane, tetrahydrofuran, pentane, hexane, heptane, petroleum ether, ligroin, methanol, ethanol, isopropanol, methyl acetate, ethyl acetate, isopropyl acetate, dimethylformamide or dimethyl sulfoxide, at from room temperature (20°–30°C) to the boiling point of the solvent employed for from several hours to several tens of hours. The reaction can also be carried out in the presence of an acid acceptor, such as potassium carbonate, sodium carbonate, triethylamine or pyridine.

The starting compounds having the formula [II] or [III] wherein M is an alkali metal atom can be produced by treating a compound having the formula [II] or [III] wherein M is H with an alkali metal compound, such as metallic sodium, sodium hydride, potassium hydride, sodium amide, potassium amide or lithium amide.

The compounds having the formula [I] can be converted in a conventional manner into the corresponding acid addition salts by treatment with various inorganic and organic acids, for example, hydrochloric, sulfuric, nitric, hydrobromic, oxalic, maleic, fumaric, tartaric, citric, o-(p-hydroxy-benzoyl)benzoic acid, phenolphthalin and the like.

Among the starting compounds [II] and [III] new compounds can be produced according to the following reaction schemes, for example [II], in which P is Cl

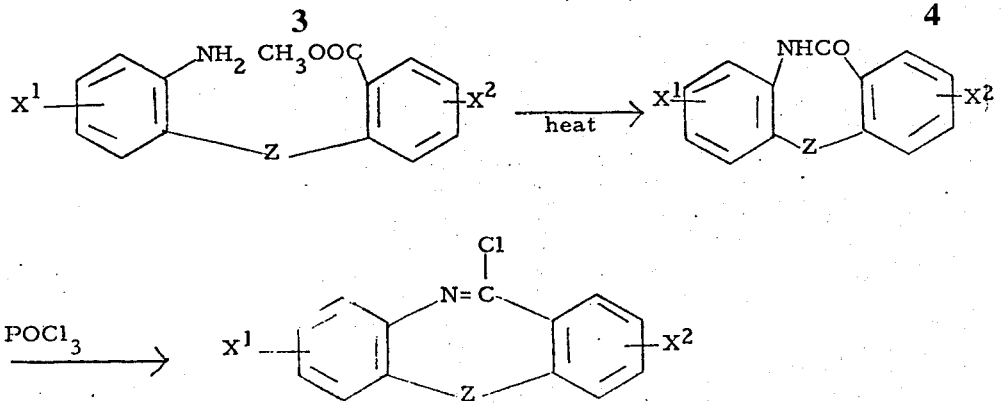

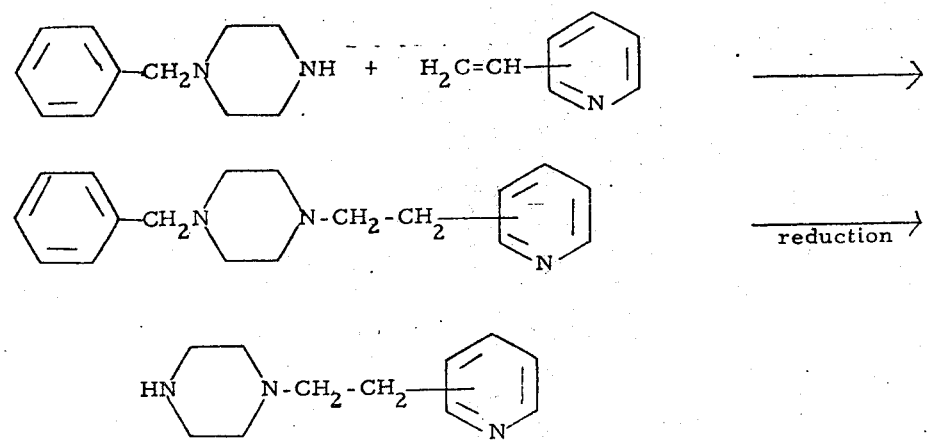

[III], in which Q is H, m and n are both 2, and Y is pyridyl

The compounds having the formula [I] and their pharmaceutically acceptable acid addition salts have various pharmacological properties, such as inhibition of edema, suppression of spontaneous motility, reserpine potentiation and analgesic action as shown, for example, by the following tests. The tests were carried out according to the following procedure:

1. Inhibition of serotonin edema and dextran edema was measured using the method described by C.A. Winter in *Proceedings of the Society for Experimental Biology and Medicine*, 111, 544 ff. (1962). The procedure used was as follows:

0.05 ml of an aqueous solution of serotonin creatinine sulfate (10) or 0.05 ml of a 2% aqueous solution of dextran was injected subcutaneously into a rat's paw (Donryu rat, male; about 150 g), each group consisting of five animals. The test compound was suspended in a 1% aqueous Polysorbate 80 solution and the suspension (5 ml/200 g of body weight) was administered orally one hour before the injection of the inflammation-causing substance. The volume of the paw was measured on hour after the injection of the serotonin or three hours after the injection of the dextran. The $ED_{50}$ shows the effective dose inhibiting edema induced by the inflammation-causing substance to 50%.

The results obtained are shown in Table 1.

2. Supression of spontaneous motility was measured using the Photocell method described by P.B. Dews in *British Journal of Pharmacology*, 8, 46 ff. (1953). The procedure used was as follows:

Male mice of the dd-strain weighing 20–25 g were gregariously placed in a box 20 × 40 × 20 cm, each group consisting of five animals. Forty minutes after the intraperitoneal administration of the test compound, the frequency of movement was counted for 20 minutes, and the frequency was regarded as the motility. The $ED_{50}$ shows the effective dose suppressing the spontaneous motility to 50%.

The results obtained are shown in Table 2.

3. Reserpine potentiation was measured using the method described by M.D. Aceto in *Toxicology and Applied Pharmacology*, 7,329 ff. (1965). The procedure used was as follows:

Thirty minutes after the subcutaneous administration of the test compound to female mice (dd-strain mice weighing 20–25 g, each group consisting of four animals), reserpine (10 mg/kg of body weight) was injected intraperitoneally. The degree of blepharoptosis of both eyes was observed 15, 60, 120 and 180 minutes after the administration of the reserpine. The $PD_{30}$ shows the effective dose potentiating the effect of reserpine by 30% 15 minutes after the administration of reserpine.

The results obtained are shown in Table 2.

4. Analgesic activity was measured using the method described by L. C. Hendershot in Journal of *Pharmacology and Experimental Therapeutics*, 125, 237 ff. (1959). The procedure used was as follows:

A 0.02% aqueous solution of benzoquinone (0.2 ml/20 g of body weight) was injected intraperitoneally into the mice weighing about 20 g, each group consisting of six animals. The test compound was suspended in a 1% aqueous Polysorbate 80 solution and the suspension (0.1 ml/10 g body weight) was administered orally one hour before the injection of the benzoquinone. The $ED_{50}$ shows the effective dose diminishing the cumulative number of writhings for 30 minutes to 50%.

The results obtained are shown in Table 3.

TABLE 1

| Compound | Inhibition of Serotonin Edema $ED_{50}$ (mg/kg) | Inhibition of Dextran Edema $ED_{50}$ (mg/kg) |
|---|---|---|
| A | 1.3 | 1.4 |
| B | 1.0 | 1.2 |
| C | 2.7 | 3.0 |
| D | 2.2 | 1.6 |
| E | 1.0 | 1.6 |
| F | 1.0 | 1.8 |
| G | 0.8 | 1.8 |
| H | 1.3 | 3.8 |
| J | 0.13 | 2.0 |
| K | 0.18 | 2.5 |
| L | 3.0 | 3.0 |
| M | 0.5 | 2.0 |
| N | 0.6 | 1.3 |
| O | 0.9 | 3.0 |
| P | 0.8 | 0.5 |
| Q | 0.16 | 0.8 |

TABLE 2

| Compound | Supression of Spontaneous Motility $ED_{50}$ (mg/kg) | Reserpine Potentiation $PD_{30}$ (mg/kg) |
|---|---|---|
| O | 1.25 – 2.5 | 0.63 – 1.25 |
| P | 0.08 – 0.16 | 0.16 – 0.31 |
| Q | 0.04 – 0.08 | 0.31 – 0.63 |
| R | 1.25 – 2.5 | 0.31 – 0.63 |

TABLE 3

| Compound | Analgesic Activity $ED_{50}$ (mg/kg) |
|---|---|
| D | 4.8 |
| E | 2.2 |
| G | 9 |
| H | 5 |
| J | 9.5 |
| K | 5 |
| N | 2.1 |
| O | 7.6 |
| P | 3.2 |
| Q | 0.94 |
| R | 6 |
| S | 5.8 |
| T | 4.2 |

In the above tables, the compounds designated by letters A to T are as follows:

A: 11-[4-(2-Thenyl)-1-piperazinyl]-dibenzo[b,f][1,4]thiazepine dihydrochloride 0.5 hydrate B: 11-(4-Benzyl-1-piperazinyl)-dibenzo[b,f][1,4]thiazepine dihydrochloride monohydrate C: 11-[4-(p-Chlorobenzyl)-1-piperazinyl]-dibenzo[b,f][1,4]thiazepine dihydrochloride monohydrate D: 11-(4-Phenethyl-1-piperazinyl)-dibenzo[b,f][1,4]thiazepine dihydrochloride monohydrate E: 2-Chloro-11-(4-phenethyl-1-piperazinyl)-dibenzo[b,f][1,4]thiazepine dihydrochloride dihydrate F: 2-Chloro-11-[4-(2-thenyl)-1-piperazinyl]-dibenzo[b,f][1,4]thiazepine Hydrochloride G: 11-(4-Benzyl-1-piperazinyl)-2-chloro-dibenzo[b,f][1,4]thiazepine Hydrochloride H: 11-[4-(2-Pyridylmethyl)-1-piperazinyl]-dibenzo[b,f][1,4]thiazepine trihydrochloride 1.5 hydrate J: 2-Chloro-11-[4-(2-pyridylmethyl)-1-piperazinyl]-dibenzo[b,f][1,4]oxazepine trihydrochloride 0.5 hydrate K: 2-Chloro-11-[4-(2-(4-pyridyl)ethyl)-1-piperazinyl]-dibenzo[b,f][1,4]-oxazepine trihydrochloride monohydrate L: 11-[4-(2-(4-Pyridyl)ethyl)-1-piperazinyl]-dibenzo[b,f][1,4]thiazepine trihydrochloride 0.5 hydrate M: 2-Chloro-11-[4-(2-pyridylmethyl)-1-piperazinyl]-dibenzo[b,f][1,4]thiazepine trihydrochloride 0.5 hydrate N: 2-Chloro-11-[4-(2-(4-pyridylethyl)-1-piperazinyl]-dibenzo[b,f][1,4]-thiazepine trihydrochloride monohydrate O: 11-[4-(2-(2-Pyridyl)ethyl)-1-piperazinyl]-dibenzo[b,f][1,4]oxazepine trihydrochloride monohydrate P: 2-Chloro-11-[4-(2-(2-pyridyl)ethyl)-1-piperazinyl]-dibenzo[b,f][1,4]-thiazepine trihydrochloride monohydrate Q: 2-chloro-11-[4-(2-(2-pyridyl)ethyl)-1-piperazinyl]-dibenzo[b,f][1,4]-oxazepine trihydrochloride monohydrate R: 11-[4-(2-(2-Pyridyl)ethyl)-1-piperazinyl]-dibenzo[b,f][1,4]thiazepine trihydrochloride dihydrate S: 11-(4-Phenethyl-1-piperazinyl)-dibenzo[b,f][1,4]oxazepine dihydrochloride 1.5 hydrate T: 2-Chloro-11-[4-(3-pyridylmethyl)-1-piperazinyl]-dibenzo[b,f][1,4]-oxazepine trihydrochloride 0.5 hydrate In view of various tests including those mentioned above, the compounds of the present invention having the general formula [I] and the pharmaceutically acceptable acid addition salts thereof can be administered safely as antiallergic agents for the treatment of various types of allergic diseases such as asthma, urticaria, eczema, hay fever, allergic migraine and pruritus cutaneous, as analgesics for the treatment of pains in post-operation, various kinds of carcinoma, delivery, myocardiac infarction, gastric and duodenal ulcer and the like, and as psychotropic agents for the treatment of schizophrenia, mania, psychroneuroses and the like, in the form of a pharmaceutical preparation with a suitable and conventional carrier or adjuvant, administrable orally or by way of injection without harm to the host.

The pharmaceutical preparations can take any conventional form such as tablets, capsules, granules, powders, syrups, injectable solutions, and the like.

The following are illustrative examples of formulations to be administered when the compounds having the formula [I] and their acid addition salts are administered for the above pharmaceutical purposes.

(a) 10 mg tablets are prepared from the following composition:
Compound having the General Formula [I]   10 mg
Lactose   70 mg
Starch   38 mg
Methyl Cellulose   1 mg
Magnesium Stearate   1 mg (b) 25 mg tablets are prepared from the following composition:
Compound having the General Formula [I]   25 mg
Microcrystalline Cellulose   20 mg
Lactose   80 mg
Starch   23.5 mg
Magnesium Stearate   1.5 mg (c) 10 mg capsules are prepared from the following composition:
Compound having the General Formula [I]   10 mg
Lactose   70 mg
Starch   20 mg (d) 10% powders are prepared by combining the following:
Compound having the General Formula [I]   10%
Lactose   70%
Starch   20%

The oral daily dose of the compounds having the general formula [I] or a salt thereof for human adults usually ranges from about 0.285 to 2.85 mg per kg of body weight, given in single or divided doses.

In the following illustrative examples of typical and presently preferred embodiments of the invention, g and ml represent "grams(s)" and milliliter(s)", respectively.

EXAMPLE 1

24.6 g of powdery 11-chloro-dibenzo[b,f][1,4]thiazepine is added little by little to a mixture of 18.2 g of N-(2-thenyl)piperazine, 15 g of potassium carbonate and 200 ml of benzene, and the resulting mixture is refluxed with vigorous stirring for 5 hours. After cooling, the potassium carbonate is filtered off and the filtrate is concentrated to give 31.7 g of white crystalline 11-[4-(2-thenyl)-1-piperazinyl]-dibenzo[b,f][1,4]thiazepine melting at 107°–110°C. This product is suspended in isopropanol and isopropanolic hydrochloric acid is added. 36.4 g of the corresponding dihydrochloride 0.5 hydrate melting at 208°–210°C is obtained.

EXAMPLE 2

To a solution of 16.3 g of N-(2-pyridyl)piperazine in 50 ml of pyridine is added slowly with stirring 4.5 g of 11-p-tolylsulfonyloxy-8-trifluoromethyl-dibenzo[b,f][1,4]thiazepine, and the resulting mixture is stirred at room temperature for 24 hours. The reaction mixture is poured into 500 ml of ice water and the oil separated is extracted with two 200 ml portions of benzene. The benzene extract is dried and then concentrated. The remaining orange-red oil is dissolved in ethanol and ethanolic hydrochloric acid is added. The hydrochloride formed is recrystallized from ethanol to give 27.7 g of 11-[4-(2-pyridyl)-1-piperazinyl]-8-trifluoromethyl-dibenzo[b,f][1,4]thiazepine dihydrochloride 0.5 hydrate melting at 185°–187°C.

EXAMPLE 3

A mixture of 37.8 g of 11-p-nitrobenzylthio-dibenzo[b,f][1,4]-thiazepine 5,5-dioxide, 36.4 g of N-(2-thenyl)piperazine and 100 ml of dioxane is refluxed for 5 hours. The dioxane is distilled off and to the residue is added ethanolic hydrochloric acid. 38.5 g of 11-[4-(2-thenyl)-1-piperazinyl]-dibenzo[b,f][1,4]thiazepine 5,5-dioxide dihydrochloride monohydrate melting at 186°–189°C is obtained.

EXAMPLE 4

A mixture of 10 g of 11-chloro-dibenzo[b,f][1,4]thiazepine, 7.2 g of N-benzylpiperazine, 9 g of triethylamine and 110 ml of toluene is stirred at 85°–90°C for 4 hours. After cooling, the reaction mixture is washed with water and dried, and then the solvent is distilled off. The remaining oil is dissolved in ethanol and ethanolic hydrochloric acid is added. 18 g of 11-(4-benzyl-1-piperazinyl)-dibenzo[b,f][1,4]thiazepine dihydrochloride monohydrate melting at 217°–218°C with decomposition (from 90% isopropanol) is obtained.

EXAMPLE 5

To a solution of 7.3 g of N-(o-methylbenzyl)piperazine in 30 ml of pyridine is added slowly 16 g of 11-p-tolylsulfonyloxy-dibenzo[b,f][1,4]-thiazepine and the resulting mixture is stirred at room temperature for 24 hours. The reaction mixture is poured into 500 ml of ice water and the oil separated is extracted with two 200 ml portions of toluene. The toluene extract is dried and concentrated. The remaining product is dissolved in 30 ml of ethanol and ethanolic hydrochloric acid is added. The hydrochloride thus obtained is recrystalized from 50% isopropanol to give 17 g of 11-[4-(o-methylbenzyl)-1-piperazinyl]-dibenzo[b,f][1,4]thiazepine dihydrochloride monohydrate melting at 171°–173°C.

EXAMPLE 6

A mixture of 16 g of 11-p-nitrobenzylthio-dibenzo[b,f][1,4]-thiazepine, 7.8 g of N-(o-methoxyphenyl)piperazine and 80 ml of dioxane is refluxed for 5 hours and then the dioxane is distilled off. To the residue is added ethanolic hydrochloric acid. 13 g of 11-[4-(o-methoxyphenyl)-1-piperazinyl]-dibenzo[b,f][1,4]thiazepine dihydrochloride melting at 211°–212°C with decomposition (from 95% isopropanol) is obtained.

EXAMPLE 7

To a mixture of 29.5 g of 11-(1-piperazinyl)-dibenzo[b,f][1,4]-thiazepine, 200 ml of anhydrous benzene and 27.8 g of potassium carbonate is added dropwise with stirring under cooling 15 g of 2-thenyl chloride. The resulting mixture is stirred at 20°C for 12 hours and then refluxed for 3 hours. After cooling, the potassium carbonate is filtered off and the benzene is distilled off. The remaining oil is instantly crystallized and the crystals are recrystallized from isopropanol to give 33.5 g of 11-[4-(2-thenyl)-1-piperazinyl]-dibenzo[b,f][1,4]thiazepine melting at 107°–110°C. The corresponding hydrochloride 0.5 hydrate melts at 208°–210°C (from 80% isopropanol).

EXAMPLE 8

A solution of 17.7 g of p-chlorobenzyl chloride in 20 ml of tetrahydrofuran is added dropwise with stirring and cooling to a solution of 29.5 g of 11-(1-piperazinyl)-dibenzo[b,f][1,4]thiazepine in 100 ml of pyridine. After stirring at 90°–95°C for 5 hours, the reaction mixture is poured into 500 ml of ice water. The oil separated is extracted with benzene and the benzene extract is washed with water and dried, and then the benzene is distilled off. The remaining oil is dissolved in isopropanol and isopropanolic hydrochloric acid is added. 40 g of 11-[4-(p-chlorobenzyl)-1-piperazinyl]-dibenzo[b,f][1,4]thiazepine dihydrochloride monohydrate melting at 232°–233°C with decomposition (from 50% isopropanol) is obtained.

EXAMPLE 9

4.8 g of a 50% sodium hydride solution is added to 200 ml of dioxane and 29.5 g of 11-(1-piperazinyl)-dibenzo[b,f][1,4]thiazepine is added and then the whole mixture is stirred. To the solution is added slowly below 30°C 18.5 g of phenethyl bromide and the resulting mixture is stirred at room temperature for 15 hours and then heated on a water bath for 5 hours. After cooling, the dioxane is distilled off and the residue is poured into water and the solution is extracted with benzene. The benzene extract is dried and concentrated, and than ethanolic hydrochloric acid is added to the oily residue. 32 g of 11-(4-phenethyl-1-piperazinyl)-dibenzo[b,f][1,4]thiazepine dihydrochloride monohydrate melting at 270°C with decomposition is obtained.

EXAMPLE 10

To a solution of 29.5 g of 11-(1-piperazinyl)-dibenzo[b,f][1,4]-thiazepine in 200 ml of dimethylformamide is added 15 g of potassium carbonate and the whole mixture is stirred. A solution of 30.5 g of o-(p-tolylsulfonyloxymethyl)toluene in 100 ml of dimethylformamide is added dropwise under ice cooling to the mixture. The whole mixture is stirred at room temperature for 15 hours and then heated on a boiling water bath for 5 hours. The dimethylformamide is distilled off and the residue is poured into ice water. The oil separated is extracted with benzene. The benzene extract is washed with water and dried, and then the benzene is distilled off. The remaining oil is dissolved in isopropanol and isopropanolic hydrochloric acid is added. 35.8 g of 11-[4-(o-methylbenzyl)-1-piperazinyl]-dibenzo[b,f][1,4]thiazepine dihydrochloride monohydrate melting at 171°–173°C with decomposition is obtained.

Using the procedures set forth in above examples, but substituting equivalent amounts of the appropriate starting materials, the following compounds are also produced:

1. 11-(4-Furfury-1-piperazinyl)-8-methyl-dibenzo[b,f][1,4]thiazepine, its dihydrochloride 0.5 hydrate melting at 193°–196°C with decomposition;
2. 8-Chloro-11-[4-(2-thenyl)-1-piperazinyl]-dibenzo[b,f][1,4]thiazepine, its dihydrochloride melting at 273°C;
3. 11-[4-(2-thiazolyl)-11-piperazinyl]-dibenzo[b,f][1,4]thiazepine, its dihydrochloride dihydrate melting at 124°C.
4. 2-Chloro-11-[4-(2-thenyl)-1-piperazinyl]-dibenzo[b,f][1,4]-thiazepine, its hydrochloride melting at 281°–282°C;
5. 11-[4-(2-thenyl)-1-homopiperazinyl]-dibenzo[b,f][1,4]thiazepine, its dioxalate monohydrate melting at 206°–207°C;
6. 2-Chloro-11-[4](2-thenyl)-1-homopiperazinyl]-dibenzo[b,f][1,4]-thiazepine, its dioxalate monohydrate melting at 162°–163°C;
7. 11-[4-(2-(2-Thienyl)ethyl)-1-piperazinyl]-dibenzo[b,f][1,4]-thiazepine, its trimaleate trihydrate melting at 199°–200°C with decomposition;
8. 11-[4-(2-Pyridylmethyl)-1-piperazinyl]-dibenzo[b,f][1,4]thiazepine, its trihydrochloride 1.5 hydrate melting at 124°–125°C;
9. 11-[4-(2-(4-Pyridyl)ethyl)-1-piperazinyl]-dibenzo[b,f][1,4]-thiazepine, its trihydrochloride 0.5 hydrate melting at 174°–176°C;
10. 2-Chloro-11-[4-(2-pyridylmethyl)-1-piperazinyl]-dibenzo[b,f][1,4]-thiazepine, its trihydrochloride 0.5 hydrate melting at 243°–245°C;
11. 2-Chloro-11-[4-(2-(4-pyridyl)ethyl)-1-piperazinyl]-dibenzo[b,f][1,4]-thiazepine, its trihydrochloride monohydrate melting at 160°–161°C;
12. 11-[4-(2-(2-Pyridyl)ethyl)-1-piperazinyl]-dibenzo[b,f][1,4]-thiazepine, its trihydrochloride dihydrate melting at 95°–97°C;
13. 2-Chloro-11-[4-(2-(2-pyridyl)ethyl)-1-piperazinyl]-dibenzo[b,f][1,4]-thiazepine, its trihydrochloride monohydrate melting at 207°–208°C;
14. 11-[4-(3-Pyridylmethyl)-1-piperazinyl]-dibenzo[b,f][1,4]thiazepine, its trihydrochloride 1.5 hydrate melting at 207°–208°C;
15. 2-Chloro-11-[4-(3-pyridylmethyl)-1-piperazinyl]-dibenzo[b,f][1,4]-thiazepine, its trihydrochloride 0.5 hydrate melting at 259°–260°C;
16. 11-[4-(p-chlorobenzyl)-1-piperazinyl]-dibenzo[b,f][1,4]thiazepine its dihydrochloride monohydrate melting at 232°–233°C with decomposition;
17. 11-[4-(m-Trifluoromethylphenyl)-1-piperazinyl]-dibenzo[b,f][1,4]-thiazepine, its dihydrochloride 0.5 hydrate melting at 182°–183°C with decomposition;
18. 11-[4-(2,5-dichlorophenyl)-1-piperazinyl]-dibenzo[b,f][1,4]-thiazepine, its dihydrochloride melting at 230°–232°C with decomposition;
19. 11-(4-Benzyl-1-piperazinyl)-2-chloro-dibenzo[b,f][1,4]thiazepine, its hydrochloride melting at 279°–280°C;
20. 2-Chloro-11-(4-phenethyl-1-piperazinyl)-dibenzo[b,f][1,4]thiazepine, its dihydrochloride dihydrate melting at 170°–171°C;
21. 11-(4-Benzyl-1-homopiperazinyl)-2-chloro-dibenzo[b,f][1,4]thiazepine, its dioxalate 0.5 hydrate melting at 161°–162°C;
22. 2-Chloro-[4-(p-chlorobenzyl)-1-homopiperazinyl]-dibenzo[b,f][1,4]-thiazepine, its dioxalate melting at 175°–176°C;
23. 11-[4-(2-Pyridylmethyl)-1-piperazinyl]-dibenzo[b,f][1,4]thiazepine 5,5dioxide, its dihydrochloride melting at 203°–204°C;
24. 11-(4-Phenethyl-1-piperazinyl)-dibenzo[b,f][1,4]thiazepine 5,5-dioxide, its dihydrochloride 0.5 hydrate melting at above 270°C;
25. 11-[4-(2-Thenyl)-1-piperazinyl]-dibenzo[b,f][1,4]oxazepine, its dihydrochloride melting at 194°–196°C with decomposition;
26. 11-[4-(2-Thenyl)-1-homopiperazinyl]-dibenzo[b,f][1,4]oxazepine, its dihydrochloride 0.5 hydrate melting at 256°C with decomposition;
27. 2-Chloro-11-[4-(2-pyridylmethyl)-1-piperazinyl]-dibenzo[b,f][1,4]-oxazepine, its trihydrochloride 0.5 hydrate melting at 225°–227°C;
28. 2-Chloro-11-[4-(2-(4-pyridyl)ethyl)-1-piperazinyl]-dibenzo[b,f][1,4]-oxazepine, its trihydrochloride monohydrate melting at 96°–98°C;
29. 11-[4-(2-Pyridylmethyl)-1-piperazinyl]-dibenzo[b,f][1,4]oxazepine, its trihydrochloride dihydrate melting at 196°–198°C;
30. 11-[4-(2-(4-Pyridyl)ethyl)-1-piperazinyl]-dibenzo[b,f][1,4]oxazepine its trihydrochloride monohydrate melting at 114°–115°C;
31. 11-[4-(2-(2-Pyridyl)ethyl)-1-piperazinyl]-dibenzo[b,f][1,4]-oxazepine, its trihydrochloride monohydrate melting at 85°–86°C;
32. 2-Chloro-11-[4-(2-(2-pyridyl)ethyl)-1-piperazinyl]-dibenzo[b,f][1,4]-oxazepine, its trihydrochloride monohydrate melting at 74°–75°C;
33. 11-[4-(3-Pyridylmethyl)-1-piperazinyl]-dibenzo[b,f][1,4]oxazepine, its trihydrochloride monohydrate melting at 235°–236°C;
34. 2-Chloro-11-[4-(3-pyridylmethyl)-1-piperazinyl]-dibenzo[b,f][1,4]-oxazepine, its trihydrochloride 0.5 hydrate melting at 255°–256°C;
35. 11-(4-Benzyl-1-piperazinyl)-dibenzo[b,f][1,4]oxazepine, its dihydrochloride monohydrate melting at 192°–199°C with decomposition;
36. 11-(4-Phenethyl-1-piperazinyl)-dibenzo[b,f][1,4]oxazepine, its dihydrochloride 1.5 hydrate melting at 234°–236°C;

37. 11-(4-Benzyl-1-homopiperazinyl)-dibenzo[b,f][1,4]oxazepine, its dihydrochloride melting at 259°–260°C;

38. 11-[4-(p-Chlorobenzyl)-1-homopiperazinyl]-dibenzo[b,f][1,4]-oxazepine, its dihydrochloride 0.5 hydrate melting at 267°–268°C;

39. 11-[4-(2-Thenyl)-1-piperazinyl]-5-methyl-5H-dibenzo[b,e][1,4]-diazepine, its dihydrochloride 0.5 hydrate melting at 230°–233°C with decomposition;

40. 11-(4-Benzyl-1-piperazinyl)-5-methyl-5H-dibenzo[b,e][1,4]diazepine, its dihydrochloride 0.5 hydrate melting at 226°–227°C with decomposition;

41. 5-Methyl-11-(4-phenethyl-1-piperazinyl)-5H-dibenzo[b,e][1,4]diazepine, its fumarate melting at 209°–210°C, and 42. 3-methoxy-11-ethyl-6-[4-(2-thenyl)-1-piperazinyl]-dibenzo[c,g][1,2,6]thiadiazocine 12,12-dioxide, its dihydrochloride monohydrate melting at 195°–197°C with decomposition.

What is claimed is:

1. A compound of the formula:

wherein X is H or Cl, and $n$ is 1 or 2; or the pharmaceutically acceptable acid addition salts thereof.

2. The compound of claim 1:
11-[4-(2-pyridylmethyl)-1-piperazinyl]-dibenzo[b,f][1,4]thiazepine.

3. The compound of claim 1:
11-[4-(2-(4-pyridyl)ethyl)-1-piperazinyl]-dibenzo[b,f][1,4]thiazepine.

4. The compound of claim 1:
2-chloro-11-[4-(2-pyridylmethyl)-1-piperazinyl]-dibenzo[b,f][1,4]thiazepine.

5. The compound of claim 1:
2-chloro-11-[4-(2-(4-pyridyl)ethyl)-1-piperazinyl]-dibenzo[b,f][1,4]thiazepine.

6. The compound of claim 1:
11-[4-(2-(2-pyridyl)ethyl)-1-piperazinyl]-dibenzo[b,f][1,4]thiazepine.

7. The compound of claim 1:
2-chloro-11-[4-(2-(2-pyridyl)ethyl)-1-piperazinyl]-dibenzo[b,f][1,4]thiazepine.

8. The compound of claim 1:
11-[4-(3-pyridylmethyl)-1-piperazinyl]-dibenzo[b,f][1,4]thiazepine.

9. The compound of claim 1:
2-chloro-11-[4-(3-pyridylmethyl)-1-piperazinyl]-dibenzo[b,f][1,4]thiazepine.

* * * * *